(12) United States Patent
Osawa et al.

(10) Patent No.: US 10,139,302 B2
(45) Date of Patent: Nov. 27, 2018

(54) HYDRAULIC PRESSURE SENSOR MOUNTING STRUCTURE

(71) Applicant: Nidec Tosok Corporation, Zama-shi, Kanagawa (JP)

(72) Inventors: Tomoka Osawa, Zama (JP); Hironobu Wakabayashi, Zama (JP); Toshiaki Nakamura, Zama (JP); Hiroshi Tatsuta, Zama (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 59 days.

(21) Appl. No.: 15/583,514

(22) Filed: May 1, 2017

(65) Prior Publication Data

US 2017/0315011 A1 Nov. 2, 2017

(30) Foreign Application Priority Data

May 2, 2016 (JP) ................................. 2016-092630

(51) Int. Cl.
*G01L 9/00* (2006.01)
*G01L 19/00* (2006.01)
*G01L 19/14* (2006.01)

(52) U.S. Cl.
CPC .......... *G01L 19/147* (2013.01); *G01L 9/0051* (2013.01); *G01L 19/0069* (2013.01)

(58) Field of Classification Search
CPC .. G01L 19/147; G01L 19/0069; G01L 9/0051
See application file for complete search history.

(56) References Cited

U.S. PATENT DOCUMENTS

| 2006/0213276 | A1* | 9/2006 | Ueyanagi | G01L 19/0084 73/754 |
|---|---|---|---|---|
| 2010/0186830 | A1 | 7/2010 | Shigyo et al. | |
| 2015/0137281 | A1* | 5/2015 | Imai | B81B 7/0051 257/415 |
| 2018/0023469 | A1* | 1/2018 | Osawa | F02B 77/082 180/441 |
| 2018/0038770 | A1* | 2/2018 | Osawa | G01M 13/02 |
| 2018/0057355 | A1* | 3/2018 | Osawa | B81B 7/0051 |
| 2018/0087990 | A1* | 3/2018 | Osawa | G01L 19/143 |
| 2018/0087991 | A1* | 3/2018 | Osawa | G01L 19/147 |
| 2018/0087992 | A1* | 3/2018 | Osawa | F15B 13/042 |
| 2018/0143093 | A1* | 5/2018 | Osawa | G01L 19/003 |
| 2018/0149539 | A1* | 5/2018 | Osawa | G01L 19/144 |

FOREIGN PATENT DOCUMENTS

| JP | 2010-174991 A | 8/2010 |
|---|---|---|
| JP | 2011-134801 A | 7/2011 |
| WO | 2010/058800 A1 | 5/2010 |

\* cited by examiner

*Primary Examiner* — Ryan D Walsh
(74) *Attorney, Agent, or Firm* — Keating & Bennett, LLP (57) ABSTRACT

Each of a plurality of hydraulic pressure sensors includes a lower case and an upper case fixed above the lower case. A valve body includes an upper body including a hole portion arranged to house the hydraulic pressure sensors, and a lower body including an oil passage. A pressed portion is defined in the lower case. The pressed portion is arranged to project horizontally in the lower case so as to be opposed to the upper case. The pressed portion is arranged to be pressed downward by a pressing portion of the upper body. At least one of the upper body and the lower body includes a positioning portion arranged to horizontally position each of the hydraulic pressure sensors in the hole portion.

10 Claims, 9 Drawing Sheets

HYDRAULIC PRESSURE SENSOR MOUNTING STRUCTURE

CROSS REFERENCE TO RELATED APPLICATIONS

This application claims the benefit of priority to Japanese Patent Application No. 2016-092630 filed on May 2, 2016. The entire contents of this application are hereby incorporated herein by reference.

BACKGROUND OF THE INVENTION

1. Field of the Invention

The present invention relates to a hydraulic pressure sensor mounting structure suitable for use as, for example, a control valve of a transmission installed in an automobile, and in particular to a mounting structure suitable for attaching a plurality of hydraulic pressure sensors to a valve body.

2. Description of the Related Art

A control valve for controlling a transmission system is typically provided in an automatic transmission installed in a vehicle. The control valve controls the transmission system by supplying a hydraulic pressure of a predetermined magnitude to the transmission system or stopping the supply using a solenoid valve device. Known control valves described in JP-A 2010-174991, JP-T 2010-058800, and JP-A 2011-134801 include a valve body including an upper body and a lower body placed one upon the other. In the valve body, an oil passage in which a hydraulic fluid flows is defined, and a solenoid valve device for making a switch in hydraulic pressure and a sensor for measuring the hydraulic pressure in the oil passage are arranged.

In known control valves, electronic devices, such as sensors, are generally attached from above valve bodies individually. In recent years, due to a demand for miniaturization, there has been an increasing need for a built-in structure in which electronic components are held between an upper body and a lower body. Such built-in structures are described in, for example, JP-A 2010-174991, WO 2010-058800, and JP-A 2011-134801.

In each of the above related-art techniques, a hydraulic pressure sensor is pressed and fixed by the upper body, and therefore, an unwanted pressing force is applied to a pressure sensor element in the hydraulic pressure sensor, which may result in a failure to accurately measure the pressure. In addition, a pressing force from the upper body may damage a structure, such as, for example, the hydraulic pressure sensor or the pressure sensor element therein. To eliminate such disadvantages, it is conceivable to increase strength of a case of the hydraulic pressure sensor, but this will lead to an increased size of the case and an increased amount of a material required for the case.

In addition, in a case where a plurality of hydraulic pressure sensors are arranged in the valve body in related art, the individual hydraulic pressure sensors are separately attached to the valve body, and therefore, the structure of the valve body is complicated, and the operation of attaching the hydraulic pressure sensors is troublesome.

SUMMARY OF THE INVENTION

A hydraulic pressure sensor mounting structure according to a preferred embodiment of the present invention includes a plurality of hydraulic pressure sensors each of which includes a lower case and an upper case fixed above the lower case; and a valve body including an upper body and a lower body, the upper body including a hole portion arranged to house the hydraulic pressure sensors, the lower body including an oil passage arranged to face the upper body.

Each of the hydraulic pressure sensors includes an oil introducing space defined in the lower case, arranged to open into the oil passage at one end, and closed at another end with a flexible plate to be deformed in accordance with hydraulic pressure; a pressure sensor element arranged on the upper case, and arranged on an opposite side of the flexible plate with respect to the oil introducing space; a pressure measuring space defined in the upper case, and arranged to surround an upper surface of the flexible plate; and a pressed portion defined in the lower case, arranged to project horizontally in the lower case relative to the upper case, and to be pressed downward by the upper body.

At least one of the upper body and the lower body includes a positioning portion arranged to horizontally position each of the hydraulic pressure sensors in the hole portion.

The upper body includes a pressing portion arranged to press the pressed portion of each of the hydraulic pressure sensors from above.

The hydraulic pressure sensor mounting structure according to a preferred embodiment of the present invention may have any of the following features (1) to (9).

(1) The hydraulic pressure sensors are arranged such that a line that joins centers of the hydraulic pressure sensors assumes the shape of a regular polygon; the hole portion includes a common space defined around a central axis of the valve body extending in a vertical direction, and a plurality of individual spaces each of which is defined on an outer side of the common space with respect to the central axis to house a separate one of the hydraulic pressure sensors; and the pressing portion is arranged at a position abutting on each individual space in the upper body.

(2) Each hydraulic pressure sensor includes a terminal pin arranged at an upper portion thereof; the terminal pin of each hydraulic pressure sensor is connected to a single printed circuit board housed in the hole portion; a power supply line common to each hydraulic pressure sensor and signal lines for the respective hydraulic pressure sensors are drawn out from the printed circuit board; at least one of an inner wall surface of the hole portion and a surface of the upper body at which the upper body is joined to the lower body includes a wiring groove arranged to connect a space in the hole portion with a space outside of the valve body; and the power supply line and the signal lines are drawn out of the valve body through the wiring groove.

(3) The wiring groove is defined in the inner wall surface of the hole portion at a position opposite to one of the hydraulic pressure sensors; and at the one of the hydraulic pressure sensors, two of the pressing portions which have the same shape in a plan view are arranged to be symmetric with respect to the wiring groove on both sides of the wiring groove in a horizontal direction.

(4) The hydraulic pressure sensor mounting structure further includes a box-shaped case being open on an upper side, and arranged on tops of the hydraulic pressure sensors; the terminal pin of each hydraulic pressure sensor is inserted into a space inside of the case through a bottom portion of the case; the case has the printed circuit board housed therein, and the terminal pins, the power supply line, and the signal lines are connected to the printed circuit board; and the space inside of the case has a resin arranged therein such that the resin covers the terminal pins and the printed circuit board.

(5) The upper body has a bracket arranged between the pressing portion and the pressed portion in the hole portion thereof.

(6) The pressing portion is defined by a shoulder portion defined in an inner wall surface of the hole portion of the upper body.

(7) The hydraulic pressure sensor mounting structure further includes a plate-shaped spacer arranged between the upper body and the lower body, the spacer including a hole in which a sensor case is inserted; and an edge of the hole of the spacer is arranged to make contact with the pressed portion defined in the lower case of each hydraulic pressure sensor.

(8) The hole portion defined in the upper body is arranged to pass through the upper body from a lower surface to an upper surface of the upper body, and an upper portion of a sensor case housed in the hole portion is arranged to project upward above the upper surface of the upper body.

(9) A surface of the lower body includes a recessed portion in which the pressed portion and a lower portion of the lower case are housed, and a surface of the pressed portion is arranged to be flush with a surface of the lower body.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

1. First Preferred Embodiment

Hereinafter, a first preferred embodiment of the present invention will be described with reference to FIGS. 1 to 11. In the present preferred embodiment, three hydraulic pressure sensors are housed in one hole portion defined in an upper body. In a description of the present preferred embodiment, an axis may refer to a central axis extending in a vertical direction of each hydraulic pressure sensor, and a circumferential direction, an axial direction, and a radial direction refer to a circumferential direction about the central axis, an axial direction of the central axis, and a radial direction with respect to the central axis, respectively, unless otherwise noted.

(1) Valve Body

Figure 1:
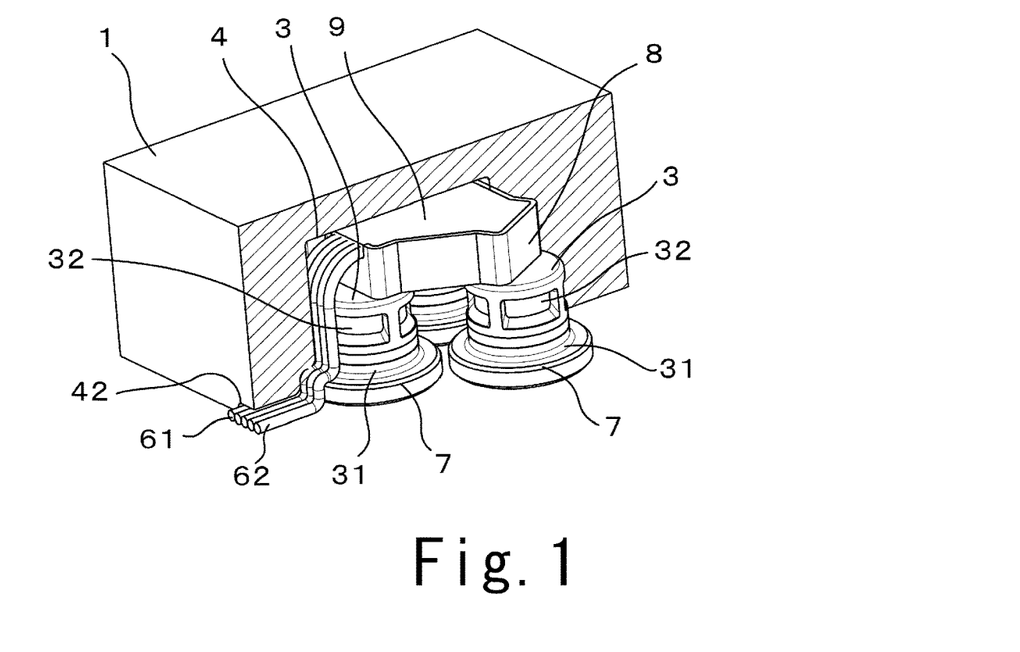
FIG. 1 is a perspective view illustrating an upper body and a plurality of hydraulic pressure sensors according to a first preferred embodiment of the present invention as viewed from above.
Figure 2:
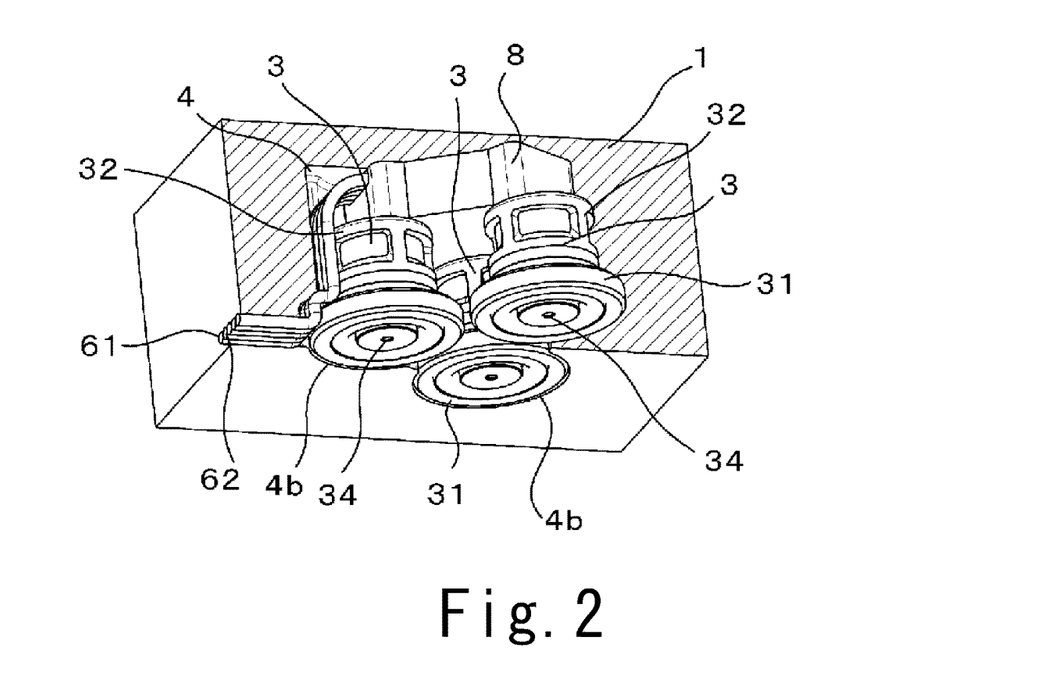
FIG. 2 is a perspective view illustrating the upper body and the hydraulic pressure sensors according to the first preferred embodiment of the present invention as viewed from below.
Figure 3:
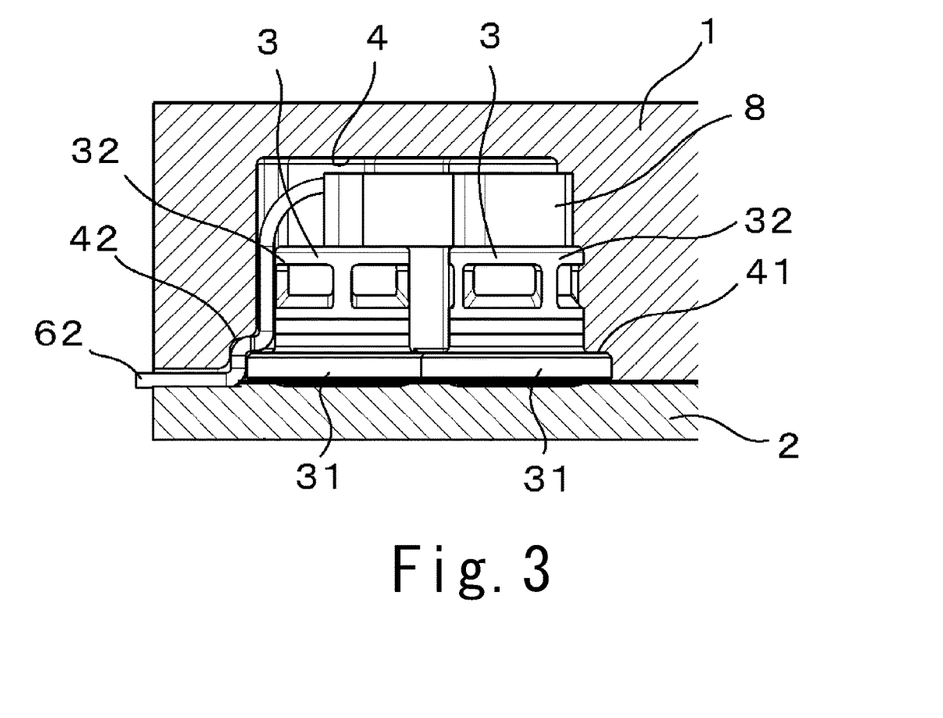
FIG. 3 is a vertical sectional view illustrating a valve body with the hydraulic pressure sensors installed therein according to the first preferred embodiment of the present invention.
Figure 4:
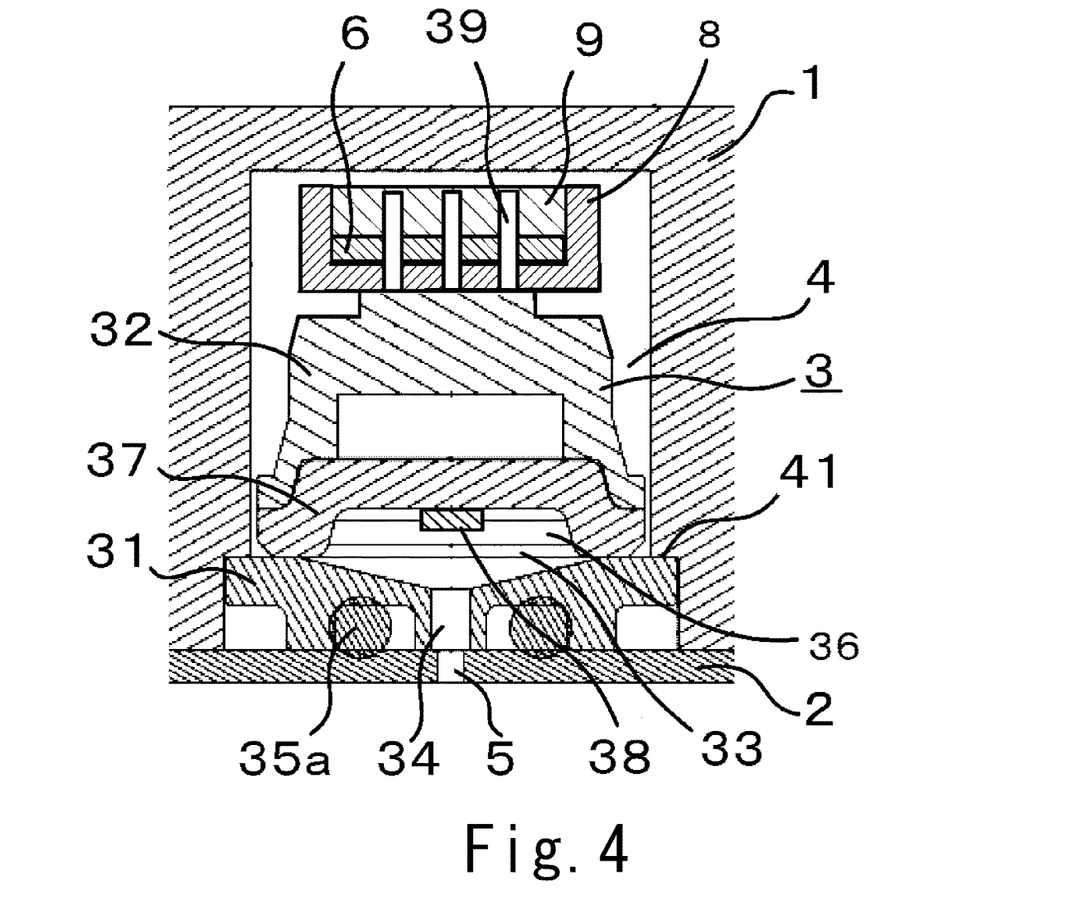
FIG. 4 is a vertical sectional view illustrating one of the hydraulic pressure sensors according to the first preferred embodiment of the present invention in an enlarged form.

As illustrated in FIGS. 3 and 4, a valve body according to the first preferred embodiment includes an upper body 1 and a lower body 2, and a hole portion 4, in which three hydraulic pressure sensors 3 are housed, is defined in a lower surface of the upper body 1. Three oil passages 5, each of which is arranged to upwardly face the upper body 1, are defined in the lower body 2, and each of the hydraulic pressure sensors 3 is fixed to an opening portion of a separate one of the oil passages 5. A printed circuit board 6 is arranged between upper portions of the three hydraulic pressure sensors 3 and a ceiling portion of the hole portion 4. As illustrated in FIGS. 1 and 2, the three hydraulic pressure sensors 3 are arranged such that a line that joins centers of the hydraulic pressure sensors 3 assumes the shape of a regular polygon, specifically, of a triangle.

(2) Hydraulic Pressure Sensor 3

As illustrated in FIGS. 3 and 4, each of the hydraulic pressure sensors 3 includes a lower case 31 and an upper case 32 fixed above the lower case 31. The lower case 31 and the upper case 32 correspond to a sensor case. An oil introducing space 34 is defined in the lower case 31. The oil introducing space 34 is arranged to open into the oil passage 5 at one end, and is closed at another end with a flexible plate 33 which is to be deformed in accordance with hydraulic pressure. A groove 35, which is recessed upward from a lower surface of the lower case 31, is defined in the lower case 31. The groove 35 is arranged radially outside of the oil passage 5. A sealant 35a, such as, for example, an O-ring, is fitted in the groove 35. A surface of contact between the lower case 31 and the lower body 2 is sealed with the sealant 35a.

An outer circumferential portion of the lower case 31 is arranged to project radially outward, i.e., horizontally in FIG. 4, relative to an outer circumference of the upper case 32. An upper surface of this projecting portion defines a pressed portion 7 in the present preferred embodiment. In the present preferred embodiment, the projecting portion which defines the pressed portion 7 is arranged to project in the form of a flange over the entire circumferential extent of the lower case 31.

Figure 7:
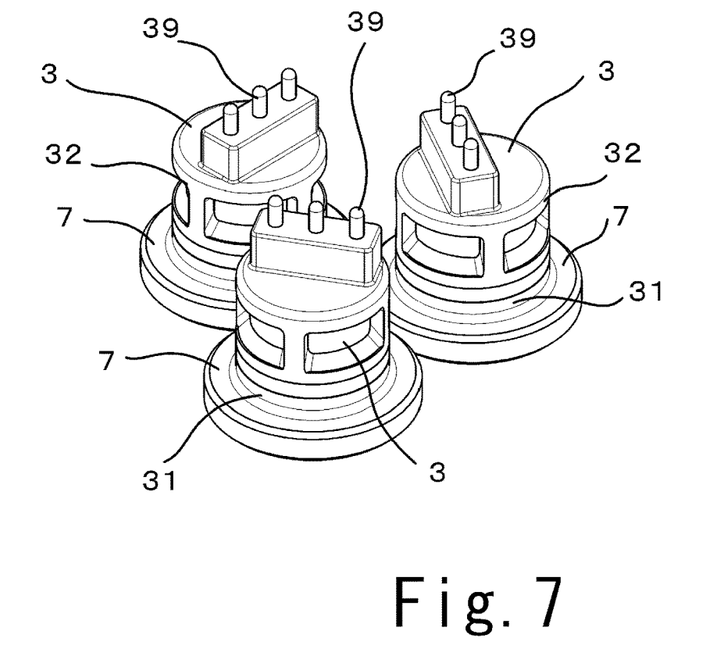
FIG. 7 is a perspective view of the hydraulic pressure sensors according to the first preferred embodiment of the present invention.
Figure 8:
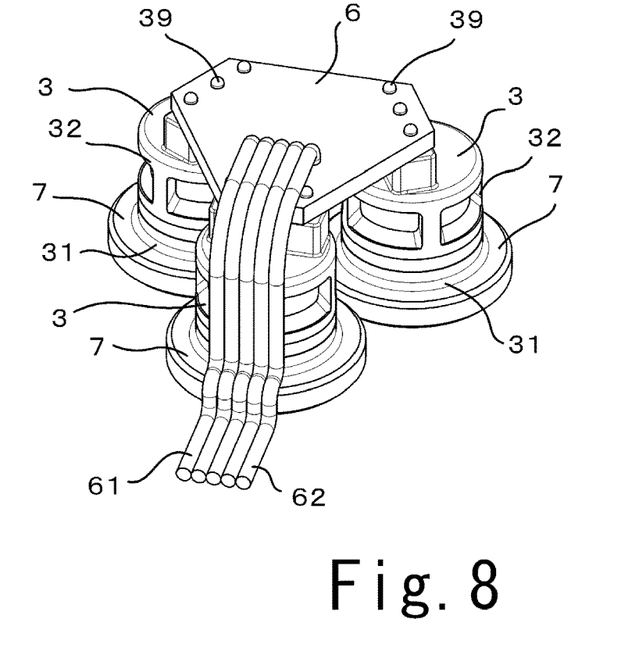
FIG. 8 is a perspective view illustrating the hydraulic pressure sensors according to the first preferred embodiment of the present invention with a board fixed thereto.

A pressure measuring space 36, which is arranged to surround an upper surface of the flexible plate 33, is defined in the upper case 32. A support member 37, which includes an outer circumferential portion fixed to the upper case 32, is arranged in the pressure measuring space 36. A pressure sensor element 38 is arranged on a lower surface of the support member 37. The pressure sensor element 38 is arranged on an opposite side of the flexible plate 33 with respect to the oil introducing space 34. When the flexible plate 33 is deformed by hydraulic pressure from the oil passage 5, the flexible plate 33 comes into contact with the pressure sensor element 38. As illustrated in FIGS. 4 and 7, the upper case 32 is provided with terminal pins 39 each of which has a spring characteristic and is connected to the pressure sensor element 38. Each terminal pin 39 is connected to the printed circuit board 6 arranged in the hole portion 4.

(3) Hole Portion 4 of Upper Body 1

Figure 5:
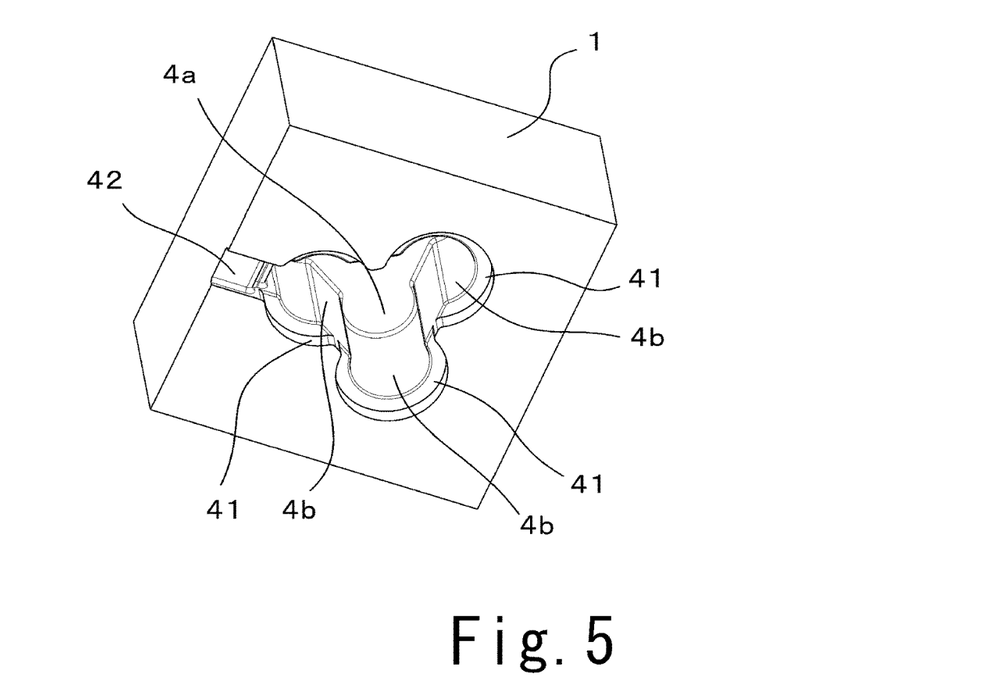
FIG. 5 is a perspective view of the upper body according to the first preferred embodiment as viewed from below.
Figure 6:
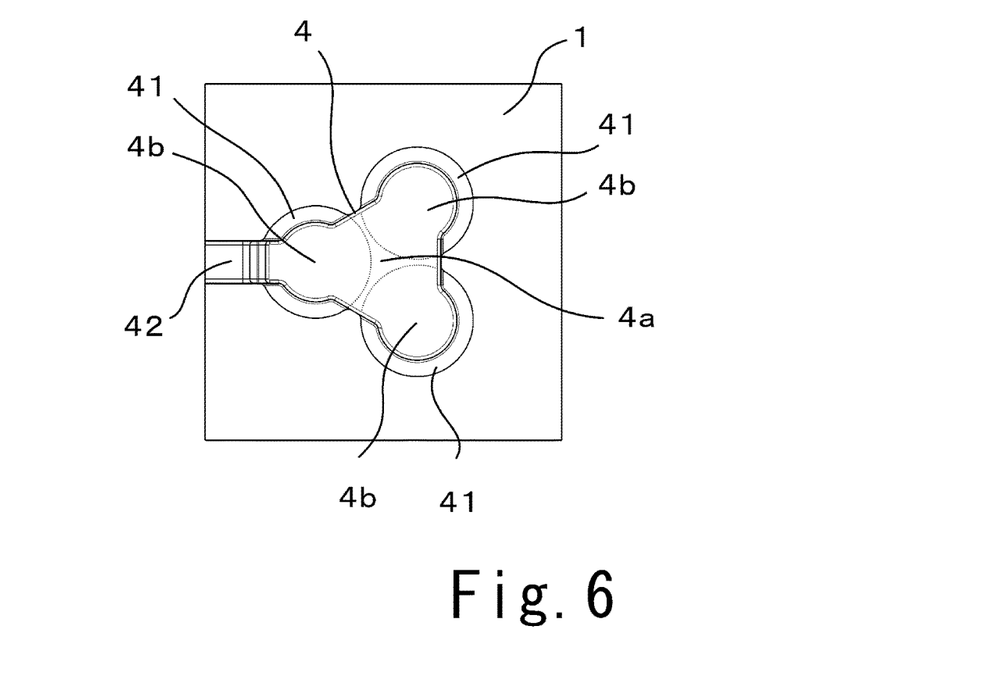
FIG. 6 is a bottom view of the upper body according to the first preferred embodiment of the present invention.

As illustrated in FIGS. 5 and 6, the hole portion 4 includes a common space 4a defined around a central axis of the upper body 1 extending in the vertical direction, and three individual spaces 4b each of which is defined on an outer side of the common space 4a with respect to the central axis to house a separate one of the hydraulic pressure sensors 3. A lower end portion of an inner wall surface of the hole portion 4 includes shoulder portions 41 arranged at positions abutting on the individual spaces 4b. That is, as illustrated in FIG. 4, an upper portion of the hole portion 4 is arranged to have an inside diameter substantially equal to an outside diameter of the upper case 32 and smaller than an outside diameter of the lower case 31. A lower portion of the hole portion 4 is arranged to have an inside diameter substantially equal to the outside diameter of the lower case 31. Accordingly, the shoulder portions 41 are defined at portions of the hole portion 4 which abut on the pressed portions of the lower cases 31, the shoulder portions 41 extending substantially all the way along the inner wall surface of the hole portion 4. A horizontally extending portion of each of the shoulder portions 41 corresponds to a pressing portion.

As illustrated in FIG. 4, a vertically extending portion of the shoulder portion 41 is arranged to make contact with an outer circumferential surface of the lower case 31 to position the hydraulic pressure sensor 3 so that the hydraulic pressure sensor 3 cannot move in the individual space 4a. The vertically extending portion of each shoulder portion 41 corresponds to a "positioning portion arranged to horizontally position each of the hydraulic pressure sensors in the hole portion". In the case where the upper portion of the hole portion 4 is arranged to have an inside diameter substantially equal to the outside diameter of the upper case 32, an inner wall surface of the upper portion of the hole portion 4, in place of the vertically extending portion of each shoulder portion 41, may define the "positioning portion arranged to horizontally position each of the hydraulic pressure sensors in the hole portion" by making contact with an outer circumferential surface of the upper case 32.

As illustrated in FIGS. 1, 2, and 3, a wiring groove 42, which is arranged to connect a space in the hole portion 4 with a space outside of the valve body, is defined in the inner wall surface of the hole portion 4 and a surface of the upper body 1 at which the upper body 1 is joined to the lower body 2. The inner wall surface of the hole portion 4 is recessed at a position opposite to one of the three hydraulic pressure sensors 3 to define the wiring groove 42. As illustrated in FIGS. 5 and 6, in an area for the hydraulic pressure sensor 3 at which the wiring groove 42 is defined in the hole portion 4, two of the shoulder portions 41, which have the same shape in a plan view, are arranged to be symmetric with respect to the wiring groove 42 on both sides of the wiring groove 42 in a horizontal direction.

(4) Printed Circuit Board 6

Figure 9:
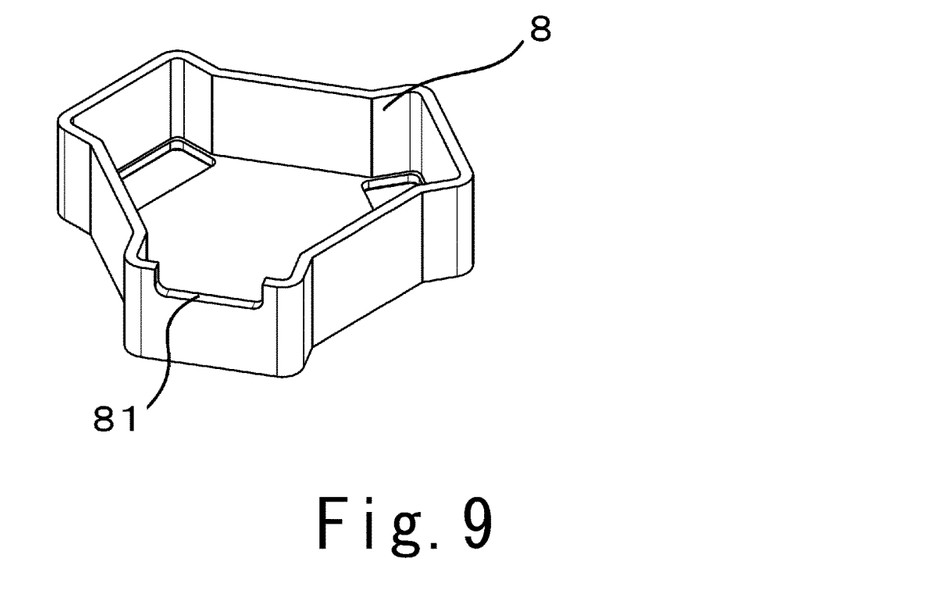
FIG. 9 is a perspective view of a case to be attached to the hydraulic pressure sensors according to the first preferred embodiment of the present invention.
Figure 10:
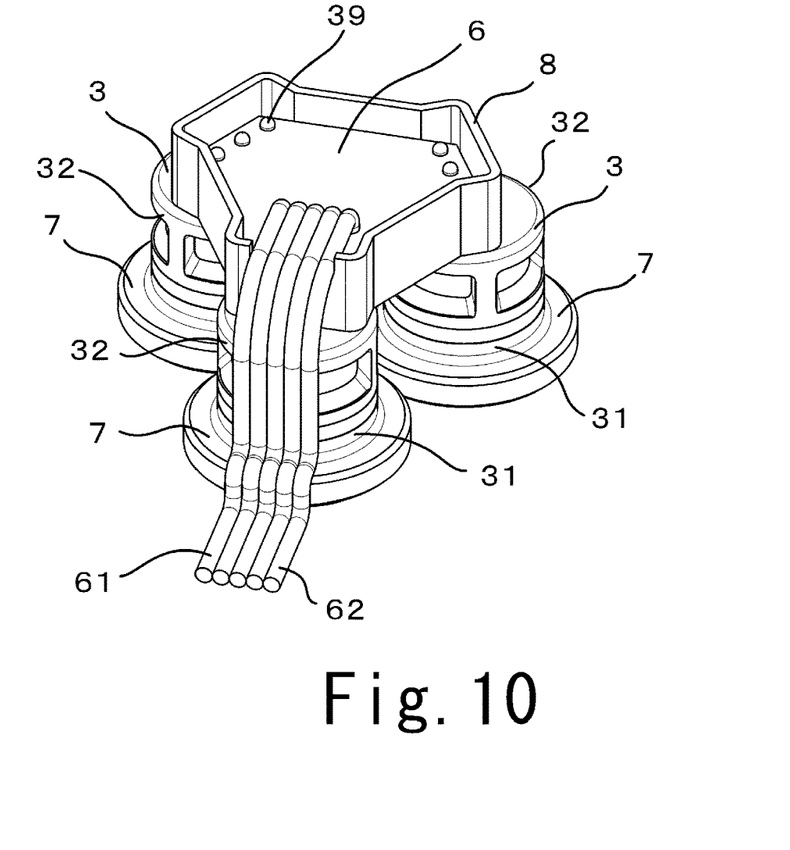
FIG. 10 is a perspective view illustrating the hydraulic pressure sensors according to the first preferred embodiment of the present invention with the case attached thereto.

As illustrated in FIGS. 9 and 10, a box-shaped case 8, which is open on the upper side and has a substantially triangular shape in a plan view, is arranged on tops of the three hydraulic pressure sensors 3, and the printed circuit board 6 is housed in the case 8. Upper portions of the terminal pins 39 of each hydraulic pressure sensor 3 are inserted into a space inside of the case 8 through a bottom portion of the case 8, and the upper portion of each terminal pin 39 is connected to a conductive pattern on the printed circuit board 6. One power supply line 61 common to each hydraulic pressure sensor 3, and three signal lines 62 for the respective hydraulic pressure sensors 3 are drawn out from the printed circuit board 6. The common power supply line 61 and the three signal lines 62 are passed through a cut portion 81 defined in a side wall of the case 8, and are drawn out of the valve body through the wiring groove 42.

The power supply line 61 according to the present preferred embodiment includes a power wire and a ground wire, i.e., two wires, in an insulating coating thereof. Note, however, that the power wire and the ground wire may alternatively be provided in separate lines. In this case, a total of five lines are drawn out from the printed circuit board 6.

Figure 11:
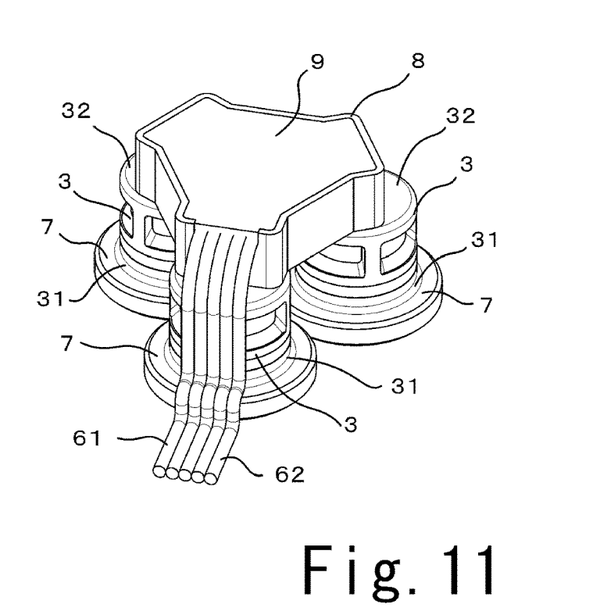
FIG. 11 is a perspective view illustrating the case with the hydraulic pressure sensors according to the first preferred embodiment of the present invention attached thereto and a resin arranged in a space inside of the case.

As illustrated in FIG. 11, a filler 9 is arranged in the space inside of the case 8 to cover and insulate the terminal pins 39, the printed circuit board 6, and junctions of the printed circuit board 6 with the power supply line 61 and the signal lines 62.

In the present preferred embodiment, as illustrated in FIG. 7, the three hydraulic pressure sensors 3 are arranged in advance in the form of a triangle, which is a form in which the three hydraulic pressure sensors 3 are to be installed in the valve body. In this situation, as illustrated in FIG. 10, the case 8 is placed on the tops of the hydraulic pressure sensors 3, with the terminal pins 39 inserted through the bottom portion of the case 8 and connected to the printed circuit board 6, which is arranged in the case 8. Here, each of the power supply line 61 and the signal lines 62 is soldered to the printed circuit board 6 in advance. After the connection of each terminal pin 39 to the printed circuit board 6 is completed, the filler 9 is poured into the case 8 and is solidified therein, so that the three hydraulic pressure sensors 3 are fixed with the case 8.

Next, the three hydraulic pressure sensors 3 are arranged on a surface of the lower body 2 in accordance with the positions of the three oil passages 5 defined in the lower body 2. In this situation, the upper body 1 is placed on the lower body 2, so that the three hydraulic pressure sensors 3 are housed in the respective individual spaces 4b of the hole portion 4. As a result, lower surfaces of the shoulder portions 41, which are defined at a lower edge of the hole portion 4 of the upper body 1, come into contact with the pressed portions 7 of the lower cases 31 of the hydraulic pressure sensors 3, so that a pressing force of the upper body 1 is transferred from each shoulder portion 41 to the corresponding lower case 31 through the corresponding pressed portion 7, and the lower case 31 is pressed against the surface of the lower body 2 by the pressing force of the upper body 1. At this time, the pressing force of the upper body 1 is not directly applied to the upper case 32, but the upper case 32 is also fixed in the hole portion 4 because the upper case 32 and the lower case 31 are fixed to each other.

When the three hydraulic pressure sensors 3 are housed in the hole portion 4, the one power supply line 61 and the three signal lines 62 drawn out from the case 8 are, in a bundle, fitted into the wiring groove 42 defined in the inner wall surface of the hole portion 4. This allows the multiple lines from the printed circuit board 6, which are connected to the individual hydraulic pressure sensors 3, to be installed in the wiring groove 42 at a time, and allows the line from each hydraulic pressure sensor 3 to be drawn out of the valve body through a gap between the upper body 1 and the lower body 2.

The present preferred embodiment is able to achieve the following beneficial effects.

(1) With a pressing force applied from the upper body 1 to the pressed portion 7 of the lower case 31, each individual hydraulic pressure sensor 3 is pressed against the lower body 2, and is thus fixed in the valve body. Therefore, each hydraulic pressure sensor 3 can be fixed only with the lower case 31, without the pressing force being transferred from the upper body 1 to the upper case 32 on which the pressure sensor element 38 is arranged. Thus, the pressure sensor elements 38, the printed circuit board 6, the lines, and other members are not damaged by a pressing force from the upper body 1.

(2) Since the plurality of hydraulic pressure sensors 3 can be housed in the single hole portion 4, it is not necessary to define a separate hole portion 4 for each of the hydraulic pressure sensors 3 in the valve body, and this allows the structure of the valve body to be simplified.

(3) Since the three hydraulic pressure sensors 3 are fixed using the case 8, and can thus be treated as one part, the hydraulic pressure sensors 3 can be installed in the valve body by inserting the hydraulic pressure sensors 3 as one part into the single hole portion 4, achieving improved workability in assembling.

(4) Since the hole portion 4 includes the individual spaces 4b arranged to house the respective individual hydraulic pressure sensors 3, and the vertically extending portions of the shoulder portions 41 defined in the hole portion 4 are arranged to make contact with the outer circumferential surfaces of the lower cases 31, each hydraulic pressure sensor 3 is not horizontally displaced in the hole portion 4. Therefore, each hydraulic pressure sensor 3 can be accurately positioned with respect to the corresponding oil passage 5 defined in the lower body 2.

(5) The plurality of hydraulic pressure sensors 3 are equally arranged in the form of a triangle, and each hydraulic pressure sensor 3 is arranged in a separate one of the individual spaces 4b which is defined in the hole portion 4 specifically for the hydraulic pressure sensor 3, and is pressed by the shoulder portion(s) 41 defined at the corresponding individual space 4b. Since the hydraulic pressure sensors 3 are equally arranged in the form of a polygon, each hydraulic pressure sensor 3 is equally pressed and is securely fixed when the hydraulic pressure sensors 3 are built in the valve body with the upper and lower bodies 1 and 2 fastened to each other.

(6) Since the power supply line 61 common to each hydraulic pressure sensor 3 and the individual signal lines 62 are drawn out of the valve body through the single wiring groove 42, a reduction in the number of parts can be achieved with standardization of the printed circuit board 6 and the lines. In addition, when compared to a related-art case where separate wiring grooves are defined for individual hydraulic pressure sensors, a reduction in the number of wiring grooves 42 and an easier operation of installing the lines in the wiring groove 42 can be achieved.

(7) In the area for the hydraulic pressure sensor 3 at which the wiring groove 42 is defined, the wiring groove 42 reduces the area of contact between the shoulder portion(s) 41 of the upper body 1 and the pressed portion 7 of the lower case 31. However, in the present preferred embodiment, the shoulder portions 41 having the same shape in the plan view are arranged to be symmetric with respect to the wiring groove 42 on both sides of the wiring groove 42 in the horizontal direction, and therefore, the hydraulic pressure sensors 3 can be pressed in a balanced manner without unevenness in pressing the hydraulic pressure sensors 3, preventing each hydraulic pressure sensor 3 from being fixed in an inclined state.

(8) Since the filler 9 is arranged in the space inside of the case 8 to cover and insulate the terminal pins 39, the printed circuit board 6, and the junctions of the printed circuit board 6 with the power supply line 61 and the signal lines 62, an improvement in insulation performance can be achieved. When compared to a case where the junctions are covered and insulated with only the filler, insulation can be more securely achieved, because the case 8 prevents an outflow of a resin of the filler 9 even when the amount of the resin of the filler 9 is increased.

2. Second Preferred Embodiment

Figure 12:
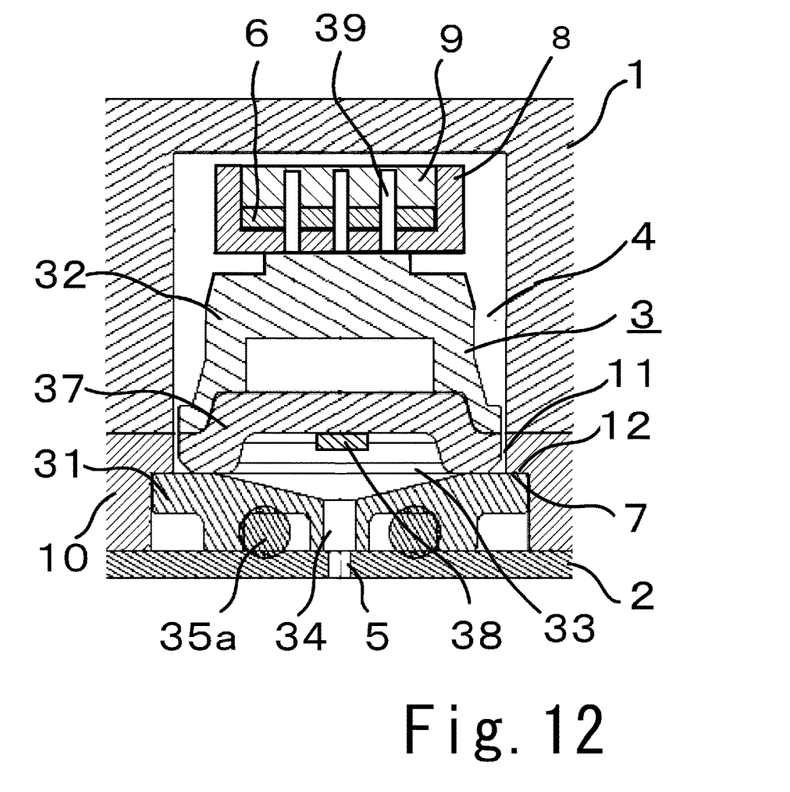
FIG. 12 is an enlarged sectional view illustrating a hydraulic pressure sensor according to a second preferred embodiment of the present invention.

A second preferred embodiment of the present invention will now be described below with reference to FIG. 12 and FIG. 3. A valve body according to the present preferred embodiment includes an upper body 1, a lower body 2, and a plate-shaped spacer 10 arranged therebetween. The spacer 10 may be referred to as an upper plate as a portion of the upper body 1.

The spacer 10 includes a hole portion 11 having the same shape in a plan view as that of a hole portion 4 defined in the upper body 1, and a common space 4a and three individual spaces 3b are defined in the hole portions 4 and 11 when the upper body 1 is placed on the spacer 10. Each of three hydraulic pressure sensors 3 is housed in a separate one of the individual spaces 3b. A wiring groove (not shown) is defined in the hole portion 11 of the spacer 10 in alignment with a wiring groove 42 of the upper body 1. A common power supply line 61 and three signal lines 62 extending from the three hydraulic pressure sensors 3 are drawn out of the valve body through the wiring groove 42 of the upper body 1 and the wiring groove of the spacer 10.

A shoulder portion 12 is defined at a lower edge of the hole portion 11 of the spacer 10, as the shoulder portions 41 are defined at the lower edge of the hole portion 4 in the first preferred embodiment. In the second preferred embodiment, a horizontally extending portion of this shoulder portion 12 corresponds to a pressing portion, and the horizontally extending portion of the shoulder portion 12 is arranged to make contact with a pressed portion 7 of a lower case 31.

The second preferred embodiment is able to achieve beneficial effects similar to those of the above-described first preferred embodiment, and, in addition, the second preferred embodiment can be implemented only by preparing the spacer 10 without the need to modify the upper body 1.

3. Third Preferred Embodiment

Figure 13:
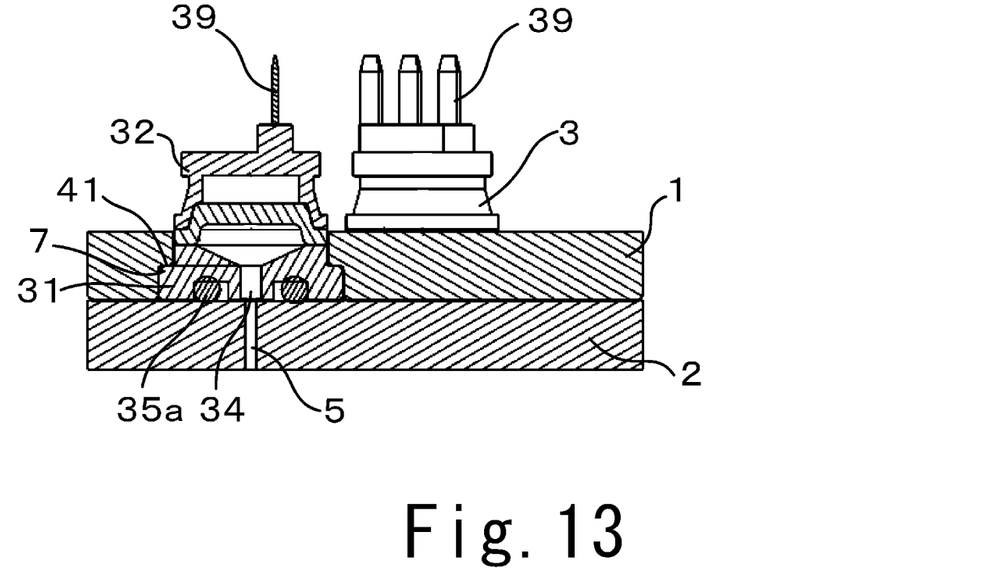
FIG. 13 is a vertical sectional view illustrating a hydraulic pressure sensor mounting structure according to a third preferred embodiment of the present invention.

A third preferred embodiment of the present invention will now be described below with reference to FIG. 13. In the present preferred embodiment, an upper body 1 includes a hole portion 4 arranged to pass through the upper body 1. An upper case 32 of each of hydraulic pressure sensors 3 is arranged to project upward above an upper surface of the upper body 1. The third preferred embodiment is otherwise similar in structure to the second preferred embodiment.

The third preferred embodiment is able to achieve beneficial effects similar to those of the above-described second preferred embodiment, and, in addition, since a portion of each hydraulic pressure sensor 3 is exposed above the upper surface of the upper body 1, wiring for terminal pins 39 is made easier. In contrast to the case where the lines are installed in the wiring groove 42 in the hole portion 4 when the valve body is assembled, wiring for the hydraulic pressure sensors 3 can be performed after the valve body is assembled, and therefore, the wiring for the hydraulic pressure sensors 3, which may be large in number, can be performed at a time, and a wiring pattern can be designed with increased flexibility.

4. Fourth Preferred Embodiment

Figure 14:
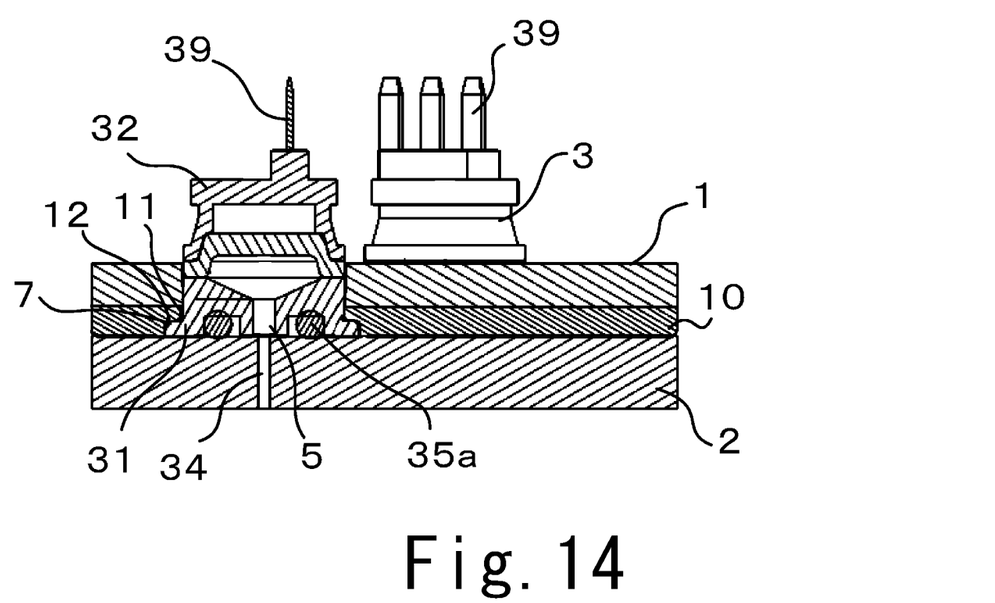
FIG. 14 is a vertical sectional view illustrating a hydraulic pressure sensor mounting structure according to a fourth preferred embodiment of the present invention.

A fourth preferred embodiment of the present invention will now be described below with reference to FIG. 14. In the fourth preferred embodiment, a plate-shaped spacer 10 is arranged between an upper body 1 and a lower body 2, a hole portion 11 through which three hydraulic pressure sensors 3 are inserted is defined in the spacer 10, and a shoulder portion 12, which is arranged to make contact with a pressed portion 7 of a lower case 31, is defined at an edge of the hole portion 11 of the spacer 10. The fourth preferred embodiment is otherwise similar in structure to the third preferred embodiment.

The fourth preferred embodiment is able to achieve beneficial effects similar to those of the above-described third preferred embodiment, and, in addition, the fourth preferred embodiment can be implemented only by preparing the spacer 10 without the need to modify the upper body 1.

5. Fifth Preferred Embodiment

Figure 15:
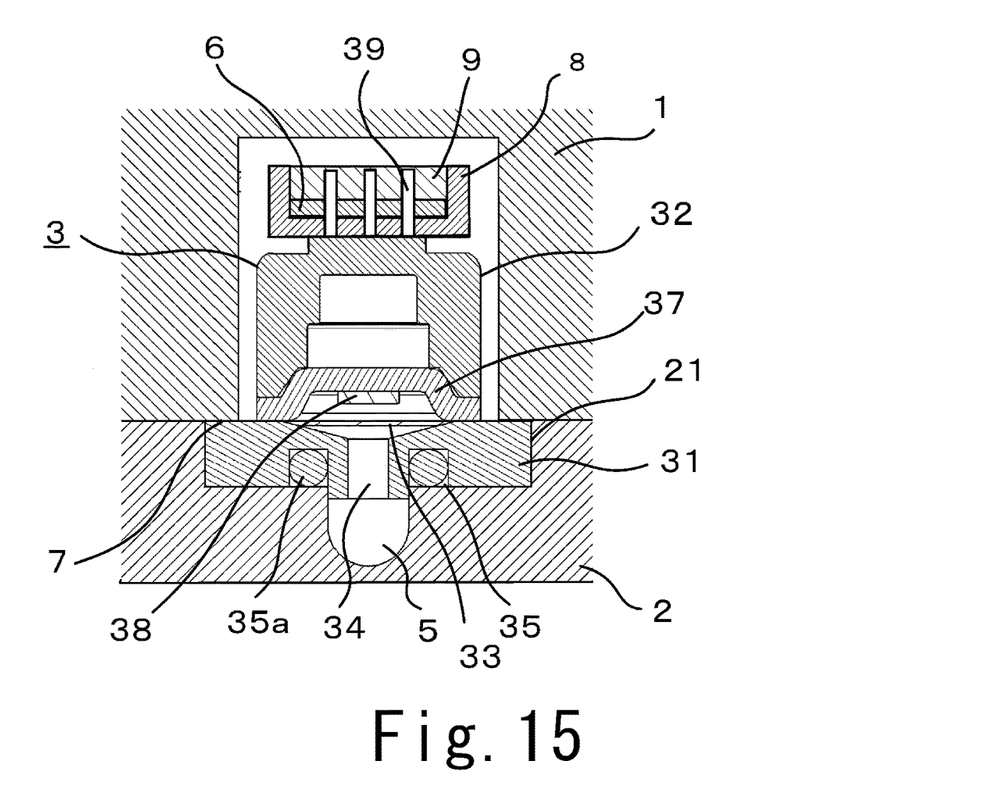
FIG. 15 is a vertical sectional view illustrating a hydraulic pressure sensor mounting structure according to a fifth preferred embodiment of the present invention.

A fifth preferred embodiment of the present invention will now be described below with reference to FIG. 15. In the present preferred embodiment, a recessed portion 21, in which a pressed portion 7 and a lower portion of a lower case 31 are housed, is defined radially outside of an oil passage 5 in a lower body 2. A surface of the pressed portion 7 is arranged to be flush with a surface of the lower body 2. An edge of a hole portion 4 of an upper body 1 is arranged to make contact with the surface of the pressed portion 7, so that the lower case 31 is pressed by the upper body 1.

The fifth preferred embodiment is able to achieve beneficial effects similar to those of the above-described second preferred embodiment, and, in addition, is advantageous in that the lower case 31 can be pressed by the edge of the hole portion 4 of the upper body 1 without the need to define a shoulder portion 41 in the upper body 1. The fifth preferred embodiment is further advantageous in that a hydraulic pressure sensor 3 is positioned also by the recessed portion 21 of the lower body 2 so that a lateral wobbling of the hydraulic pressure sensor 3 can be prevented.

6. Other Preferred Embodiments

The present invention is not limited to the above-described preferred embodiments. The above-described preferred embodiments have been presented by way of example only, and may be embodied in a variety of other forms. Various omissions, substitutions, and changes may be made without departing from the scope of the invention. These preferred embodiments and modifications thereof fall within the scope and spirit of the invention and the scope of equivalents thereof. Examples thereof will now be described below.

(1) In a preferred embodiment of the present invention, an oil introducing space 34 defined in a lower case 31 may be arranged to extend in the vertical direction as in the preferred embodiments illustrated in the accompanying drawings, or may alternatively be arranged to extend downward from an upper end and bend at a midpoint to extend horizontally at another end, as long as the oil introducing space 34 is arranged to open into an oil passage 5 at one end, and is closed at another end with a flexible plate 33 which is to be deformed in accordance with hydraulic pressure.

(2) The pressed portion 7 defined in the lower case 31 does not need to be arranged in the form of a flange over the entire circumferential extent of the lower case 31. In a preferred embodiment of the present invention, an outer circumferential portion of a lower case 31 may include projecting portions arranged at regular intervals or with appropriate spacing, with an upper surface of each projecting portion defining a pressed portion 7.

(3) In a preferred embodiment of the present invention, a portion of an inner wall surface of a hole portion 4 may be cut to define a shoulder portion 41. In another preferred embodiment of the present invention, a projection to be engaged with a lower case 31 may be defined in an inner wall surface of a hole portion 4, with a lower surface of the projection defining a shoulder portion 41.

(4) In the preferred embodiments illustrated in the accompanying drawings, the shoulder portion is defined at the lower edge of the hole portion 4 of the upper body 1 or at the lower edge of the hole portion 11 of the spacer 11, and the horizontally extending portion of the shoulder portion defines the pressing portion. However, in a preferred embodiment of the present invention, a ceiling portion of a hole portion 4 may define a pressing portion, and a bracket separate from an upper body 1 and a lower body 2 may be arranged between the pressing portion and a pressed portion 7 of a lower case 31, with neither the hole portion 4 nor a hole portion 11 being worked. Use of such a bracket makes it possible to press the lower case 31 without the upper body 1 being worked specifically for that purpose.

Figure 16:
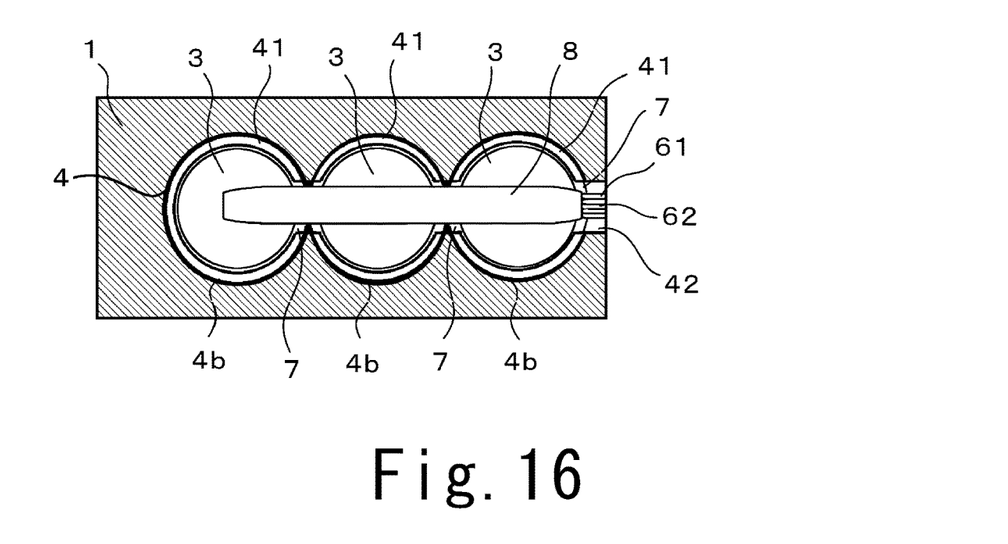
FIG. 16 is a horizontal sectional view illustrating a hydraulic pressure sensor mounting structure according to another preferred embodiment of the present invention.

(5) In each of the preferred embodiments illustrated in the accompanying drawings, the three hydraulic pressure sensors 3 are housed in the single hole portion 4. However, in other preferred embodiments of the present invention, the number of hydraulic pressure sensors 3 housed in a hole portion 4 may be two or greater than three. In this case, the hydraulic pressure sensors 3 may be arranged in a single straight line as illustrated in FIG. 16 or in a plurality of straight rows, or may alternatively be arranged such that a line that joins centers of the hydraulic pressure sensors 3 assumes the shape of a regular polygon.

(6) In each of the preferred embodiments illustrated in the accompanying drawings, the single printed circuit board 6 common to all the plurality of hydraulic pressure sensors 3 is connected to the hydraulic pressure sensors 3. However, in other preferred embodiments of the present invention, a separate printed circuit board 6 may be provided for each of a plurality of hydraulic pressure sensors 3, or two or more of hydraulic pressure sensors 3 adjacent to each other may be provided with a common printed circuit board 6.

(7) In a preferred embodiment of the present invention, without a printed circuit board 6 being provided with a case 8, an insulating coating may be applied on the board, or the board may be covered with a sufficient resin, to provide insulation between the printed circuit board and terminals or wires.

(8) The hole portion 4 defined in the upper body may have any desirable shape as long as the hole portion 4 includes the pressing portion to press the pressed portion 7 of the lower case 31. In a preferred embodiment of the present invention in which a projecting pressing portion is defined at a lower edge of an inner wall surface of a hole portion 4, and in a preferred embodiment of the present invention in which a spacer is provided as in each of the second and fourth preferred embodiments, the hole portion 4 may be simply arranged to have a circular, square, or rectangular cross section.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A hydraulic pressure sensor mounting structure comprising:
   a plurality of hydraulic pressure sensors each of which includes a lower case and an upper case fixed above the lower case; and
   a valve body including an upper body and a lower body, the upper body including a hole portion arranged to house the hydraulic pressure sensors, the lower body including an oil passage arranged to face the upper body; wherein
   each of the hydraulic pressure sensors includes:
   an oil introducing space defined in the lower case, arranged to open into the oil passage at one end, and closed at another end with a flexible plate to be deformed in accordance with hydraulic pressure;
   a pressure sensor element arranged on the upper case, and arranged on an opposite side of the flexible plate with respect to the oil introducing space;
   a pressure measuring space defined in the upper case, and arranged to surround an upper surface of the flexible plate; and
   a pressed portion arranged to project horizontally in the lower case, and to be pressed downward by the upper body;
   at least one of the upper body and the lower body includes a positioning portion arranged to horizontally position each of the hydraulic pressure sensors in the hole portion; and
   the upper body includes a pressing portion arranged to press the pressed portion of each of the hydraulic pressure sensors from above.

2. The hydraulic pressure sensor mounting structure according to claim 1, wherein
   the hydraulic pressure sensors are arranged such that a line that joins centers of the hydraulic pressure sensors assumes a shape of a regular polygon;
   the hole portion includes a common space defined around a central axis of the valve body extending in a vertical direction, and a plurality of individual spaces each of which is defined on an outer side of the common space with respect to the central axis to house a separate one of the hydraulic pressure sensors; and
   the pressing portion is arranged at a position abutting on each individual space in the upper body.

3. The hydraulic pressure sensor mounting structure according to claim 1, wherein
   each hydraulic pressure sensor includes a terminal pin arranged at an upper portion thereof;
   the terminal pin of each hydraulic pressure sensor is connected to a single printed circuit board housed in the hole portion;
   a power supply line common to each hydraulic pressure sensor and signal lines for the respective hydraulic pressure sensors are drawn out from the printed circuit board;
   at least one of an inner wall surface of the hole portion and a surface of the upper body at which the upper body is joined to the lower body includes a wiring groove arranged to connect a space in the hole portion with a space outside of the valve body; and
   the power supply line and the signal lines are drawn out of the valve body through the wiring groove.

4. The hydraulic pressure sensor mounting structure according to claim 3, wherein
   the wiring groove is defined in the inner wall surface of the hole portion at a position opposite to one of the hydraulic pressure sensors; and
   at the one of the hydraulic pressure sensors, two of the pressing portions which have a same shape in a plan view are arranged to be symmetric with respect to the wiring groove on both sides of the wiring groove in a horizontal direction.

5. The hydraulic pressure sensor mounting structure according to claim 3, further comprising a box-shaped case being open on an upper side, and arranged on top of the hydraulic pressure sensors, wherein
   the terminal pin of each hydraulic pressure sensor is inserted into a space inside of the case through a bottom portion of the case;
   the case has the printed circuit board housed therein, and the terminal pins, the power supply line, and the signal lines are connected to the printed circuit board; and
   the space inside of the case has a resin arranged therein such that the resin covers the terminal pins and the printed circuit board.

6. The hydraulic pressure sensor mounting structure according to claim 1, wherein the upper body has a bracket arranged between the pressing portion and the pressed portion in the hole portion thereof.

7. The hydraulic pressure sensor mounting structure according to claim 1, wherein the pressing portion is defined by a shoulder portion defined in an inner wall surface of the hole portion of the upper body.

8. The hydraulic pressure sensor mounting structure according to claim 1, further comprising a plate-shaped spacer arranged between the upper body and the lower body, the spacer including a hole in which a sensor case is inserted, wherein an edge of the hole of the spacer is arranged to make contact with the pressed portion defined in the lower case of each hydraulic pressure sensor.

9. The hydraulic pressure sensor mounting structure according to claim 1, wherein
- the hole portion defined in the upper body is arranged to pass through the upper body from a lower surface to an upper surface of the upper body; and
- an upper portion of a sensor case housed in the hole portion is arranged to project upward above the upper surface of the upper body.

10. The hydraulic pressure sensor mounting structure according to claim 1, wherein
- a surface of the lower body includes a recessed portion in which the pressed portion and a lower portion of the lower case are housed; and
- a surface of the pressed portion is arranged to be flush with a surface of the lower body.

* * * * *